(12) United States Patent
Francois et al.

(10) Patent No.: US 6,186,626 B1
(45) Date of Patent: *Feb. 13, 2001

(54) PAIR OF MULTIFOCAL PROGRESSIVE SPECTACLE LENSES

(75) Inventors: Sandrine Francois, Saint Jacques; Bernard Bourdoncle, Paris, both of (FR)

(73) Assignee: Essilor International, Charenton Cedex (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/173,919

(22) Filed: Oct. 16, 1998

(51) Int. Cl.$^7$ ...................................................... G02C 7/06
(52) U.S. Cl. ........................................... 351/169; 351/177
(58) Field of Search ..................................... 351/168, 169, 351/170, 171, 172, 177

(56) References Cited

U.S. PATENT DOCUMENTS

| | | | |
|---|---|---|---|
| Re. 34,132 | * 11/1992 | Kitani | 351/169 |
| 4,606,622 | 8/1986 | Fueter et al. | 351/169 |
| 4,787,733 | * 11/1988 | Silva | 351/177 |
| 5,270,745 | 12/1993 | Pedrono | 351/169 |
| 5,272,495 | * 12/1993 | Pedrono | 351/169 |
| 5,488,442 | 1/1996 | Harsigny et al. | 351/169 |
| 5,666,184 | 9/1997 | Umeda et al. | 351/169 |
| 5,708,492 | * 1/1998 | Kitani | 351/169 |
| 5,710,615 | * 1/1998 | Kitani | 351/169 |
| 5,719,658 | 2/1998 | Ahsbahs et al. | 351/169 |

OTHER PUBLICATIONS

Guilino, Applied Optics, "Design Philosophy for Progressive Addition Lenses", 32:111–117, Jan. 1, 1993.

* cited by examiner

Primary Examiner—Scott J. Sugarman
(74) Attorney, Agent, or Firm—Fish & Richardson, P.C.

(57) ABSTRACT

The invention relates to a pair of progressive ophthalmic spectacle lenses; each lens has an aspherical surface with a far vision zone, an intermediate vision zone and a near vision zone, and good monocular and binocular foveal vision along the principal meridian. At each point of the aspherical surface there is a mean sphere which is proportional to the half sum of the maximum and minimum radii of curvature expressed in meters, and to the refractive index of the lens material. The invention suggests reducing, for a given direction of sight, the absolute value of the difference between a binocularity parameter for two points in the object space. The binocularity parameter is defined for a point in the object space as the relative difference ΔS of the mean sphere for the points of the aspherical surface of the right and left lenses through which the wearer sees said point.

36 Claims, 5 Drawing Sheets

PAIR OF MULTIFOCAL PROGRESSIVE SPECTACLE LENSES

BACKGROUND OF THE INVENTION

The invention relates to multifocal spectacle lenses. Such lenses have a dioptric power varying according to the zone of vision on the lens, and are typically used for spectacle wearers suffering from presbyopia.

Multifocal lenses comprise lenses known as progressive lenses adapted to vision at all distances. These lenses usually comprise a torical or spherical surface, that may be adapted to the wearer of the spectacle lenses, and an aspherical surface chosen from a family of surfaces. Each point of an aspherical surface is usually characterised by a mean sphere S and by a cylinder C. Mean sphere S is defined from the formula $$S = \frac{n-1}{2}\left(\frac{1}{R_1} + \frac{1}{R_2}\right)$$

in which:
  $R_1$ and $R_2$ are the maximum and minimum radii of curvature expressed in meters, and
  n is the refractive index of the lens material.
With the same definitions, cylinder C is given by the formula:

$$C = (n-1)\left|\frac{1}{R_1} - \frac{1}{R_2}\right|$$

Progressive multifocal ophthalmic lenses comprise a far vision region, a near vision region, an intermediate vision region, and a main meridian of progression passing through the three regions. For such lenses, the addition value A is defined as the variation in mean sphere between a reference point in the far vision region and a reference point in the near vision region.

Progressive multifocal ophthalmic lenses also comprise a main meridian of progression, also called principal line of sight; it is a line usually defined as the intersection of the line of sight with the aspherical surface of each lens when the wearer of the lenses fixes a point in the object space in front of him, at various distances.

French patent application FR-A-2 699 294 comprises in its preamble more detailed definitions of the various elements of a progressive multifocal ophthalmic lens (main meridian of progression, far vision region, near vision region, power addition value, etc..); it also describes the work carried out by the applicant to improve wearer comfort of such lenses.

One of the problems for multifocal lenses is the taking into account of binocularity. Indeed, human vision is the result of the combination of vision through two eyes, or fusion of the images provided by the two eyes. When the image of a point of the object space on the retina of the right and left eye is at two corresponding or homologous points, the images provided by both eyes are combined, so that the person wearing the spectacle lenses only sees one object point. There may be binocular vision with a single object point even if the two points are not perfectly homologous points, provided they are not too far from being homologous.

One of the constraints facing the manufacturer of multifocal lenses is to design lenses that will provide appropriate power correction for one eye—that is provide appropriate power for any direction of sight-, and also allow proper fusion of the images of the two eyes, that is allow binocular vision.

For lenses of the prior art that have symmetry with respect to the main meridian of progression, it is usual to partially rotate the lens by about 10° when fitting the lenses in the spectacle frame, so as to accommodate the accommodation convergence of the eyes. This solution is a very rough estimate, and is not fully satisfactory for ensuring binocular vision.

U.S. Pat. No. 4,606,622 discusses the problem of fusion of the images provided by the two eyes of the wearer of multifocal spectacle lenses. This document notably discusses the problems of binocular vision in multifocal progressive lenses, and suggests to fit the lens with a non-straight principal line of sight. This line is inclined towards the nose at least in the near vision zone. The right and left lenses are symmetrical. For ensuring binocularity, it is suggested to consider lines of sight originating from the two eyes, for a given point in the object space, and to consider the curvature of the lens at the points of intersection of these lines with the two spectacle lenses; each line of sight extends on one of the temporal and nasal sides of a lens, and due to symmetry of the lenses, the difference in the curvature is thus only considered on one single lens. This document therefore suggests that the curvature of the lens be substantially symmetrical on opposite sides of the intercept of the principal line of sight to ensure a good foveal vision.

U.S. Pat. No. 5,666,184 also discusses the problem of binocularity, and suggests to limit, in the near vision portion, the difference in astigmatism on a horizontal line, between points that are symmetric with respect to the prime line of sight.

The solution of these two documents—asymmetrical design with a symmetry of astigmatism with respect to the principal line of sight—may be appropriate for static vision: the difference between the images of a point in the object space is sufficiently limited for allowing binocular vision in the far and near vision zone of a multifocal lens, so that the lenses ensure a good foveal vision in these zones.

However, this solution does not bring a solution to the problem of dynamic vision, or vision of the wearer of the spectacle outside of the near and far vision zone. A number of wearers cannot adapt to multifocal lenses due to problems in dynamic vision, that may originate in bad or inappropriate binocular vision.

SUMMARY OF THE INVENTION

The invention provides a solution to this problem. It proposes an optical lens which ensures correct dynamic vision, and appropriate fusion of the images provided by the eyes outside of the static vision fields.

More specifically, the invention provides a pair of progressive ophthalmic spectacle lenses, each lens having an aspherical surface with a far vision zone, an intermediate vision zone and a near vision zone, and good monocular and binocular foveal vision along a principal meridian, each point M of the aspherical surface having a mean sphere defined by the formula:

$$S = \frac{n-1}{2}\left(\frac{1}{R_1} + \frac{1}{R_2}\right)$$

where $R_1$ and $R_2$ are maximum and minimum radii of curvature expressed in meters, and n is the refractive index of the lens material, wherein, for a given direction of sight, the absolute value of the difference between a binocularity parameter for two points in the object space is as small as possible, said binocularity parameter being defined, for a point (M) in the object space as the relative difference ΔS of the mean sphere for the points ($M_D$, $M_G$) of the aspherical surface of the right and left lenses through which the wearer sees said point (M).

In one embodiment of the invention, the relative difference ΔS is defined by the formula $$\Delta S = 100 \times \frac{S_D - S_G}{(S_D + S_G)/2}$$

where $S_D$ and $S_G$ are the values of mean sphere at said points ($M_D$, $M_G$) of the aspherical surface of the right and left lenses through which the wearer sees said point (M).

The said two points in the object space may be sampled on a vertical plane.

In this case, the vertical plane is preferably spaced about 80 cm from the lenses.

In another embodiment of the invention, the said points in the object space are sampled from a set of points in the object space are sampled from a set of points in the object space chosen so that points of the aspherical surface through which the wearer sees said points of said set are distributed on each of the right and left lenses.

Preferably, said given direction of sight corresponds to an object point in front of the wearer, at a distance of about 80 cm, and about 50 cm lower that the eyes of the wearer.

In one embodiment of the invention, the aspherical surface of each lens has an addition (A) defined as the difference in mean sphere between a reference point of the near vision zone and a reference point of the far vision zone, and the relative difference ΔS is less than a maximum value, said maximum value being a function of said addition.

In this case, said maximum value may be an increasing function of said addition.

The maximum value is preferably within 30% of a function f of the addition, with $f(A)=5.9 \times A-2.35$

BRIEF DESCRIPTION OF THE DRAWINGS

Further features and advantages of the present invention will become more clear from the description which follows of one embodiment of the invention provided by way of non-limiting example with reference to the attached drawings, in which.

DESCRIPTION OF THE PREFERRED EMBODIMENTS

The invention proposes to improve the behaviour of the lenses in peripheral vision, for lenses which already have good foveal monocular or binocular vision on at least the principal line of sight or principal meridian.

The invention proposes taking into account, for defining ophthalmic spectacle lenses, a binocularity parameter which is defined for a given fixation point. This fixation point may be any point in the object space, since its only function is to allow the pupils to rest in a fixed position. For one point in the object space, the binocularity parameter is defined as the difference in mean sphere on the aspherical surfaces of the lenses between points of the surfaces corresponding to rays originating from both pupil centers and directed towards said point. Over the aspherical surface lens, that is for the whole vision field, the invention teaches that this difference should be as small as possible.

The invention also gives an upper limit or maximum value for this difference; when the difference lies below this limit for all points of the aspherical surface of the lens, or for the different peripheral directions, acceptable binocular vision is ensured for the whole field of vision of the lens, and the wearer of the spectacle lenses benefits from correct dynamic vision.

The maximum value depends on the addition (A). The maximum value is an increasing function of the addition (A). The maximum value of the binocularity parameter depends on the addition (A), to ensure an acceptable binocular vision over the aspherical surface of the lens, that is for the whole field of vision.

Figure 1:
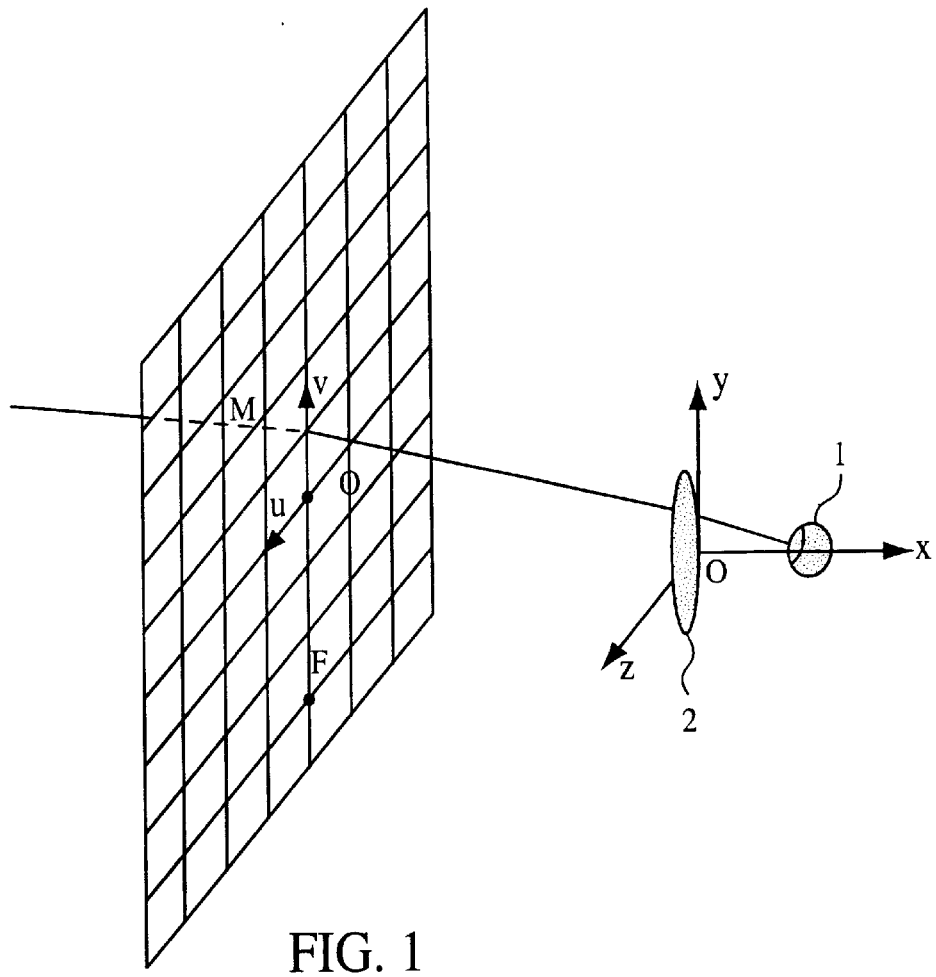
FIG. 1 is a diagrammatic representation of an eye-lens system according to the invention.

The rest of the present description discloses a preferred embodiment of the invention, where a grid is used for assessing the difference in mean sphere between the right and left lenses of a pair of spectacle lenses. FIG. 1 is a diagrammatic representation of an eye-lens system according to the invention, showing the grid.

On FIG. 1 is shown the right eye 1, the spectacle lens 2 for the right eye and the grid used for the definition of the lenses according to the invention. FIG. 1 shows a set of Cartesian coordinates (O. x, y, z), the origin of which is point O, defined as follows. The origin O is the center of the rear surface of the right lens. It is located in the horizontal plane containing the center of rotation of the right eye, at a distance d of 27 mm from the center of rotation of the right eye. This distance d corresponds to the mean distance between the center of rotation of the eyes and their respective spectacle lenses, so that the center of each of the spectacle lens is in the (x, y) plane. The distance between the lenses is chosen identical to the mean distance between the pupils of the left and right eyes, that is at a value of 65 mm.

The x-axis is directed from the lens to the eyes; the y-axis is vertical, and the z-axis is horizontal and directed from the right to the left.

In the set of coordinates thus defined:

the center of the left eye is set at the coordinates (d, 0, 65 mm);

the center of the right eye is set at the coordinates (d, 0, 0 mm);

the center of the surface of the left spectacle lens facing the wearer is at the coordinates (0, 0, 65 mm); and the center of the surface of the right spectacle lens facing the wearer is at the coordinates (0, 0, 0 mm), by definition of the origin.

In this set of coordinates, the invention proposes to use a vertical grid, the center of which is at a point G set at the coordinates (−800; 0; 32.5), in mm. In other words, the grid is at a distance of the surface of the spectacle facing the wearer of 80 cm, and is located in front of the wearer of the spectacle lenses, in the sagittal plane, in the horizontal direction of sight.

In the grid, a set (G, u, v) of coordinates is defined as follows. The u-axis is parallel to the z-axis defined above and the v-axis is parallel to the y-axis.

In the drawing of FIG. 1, the eye is directed so as to look at a given point F, the coordinates of which are (−800; −500; 32.5), or (0, −500) in the set of coordinates in the grid. The choice of this point F is representative of the position of the pupil. The exact choice of this point is not particularly essential for the invention, and the results of the invention are achieved for different choices of the point in the object space toward which the eye is directed.

Figure 2:
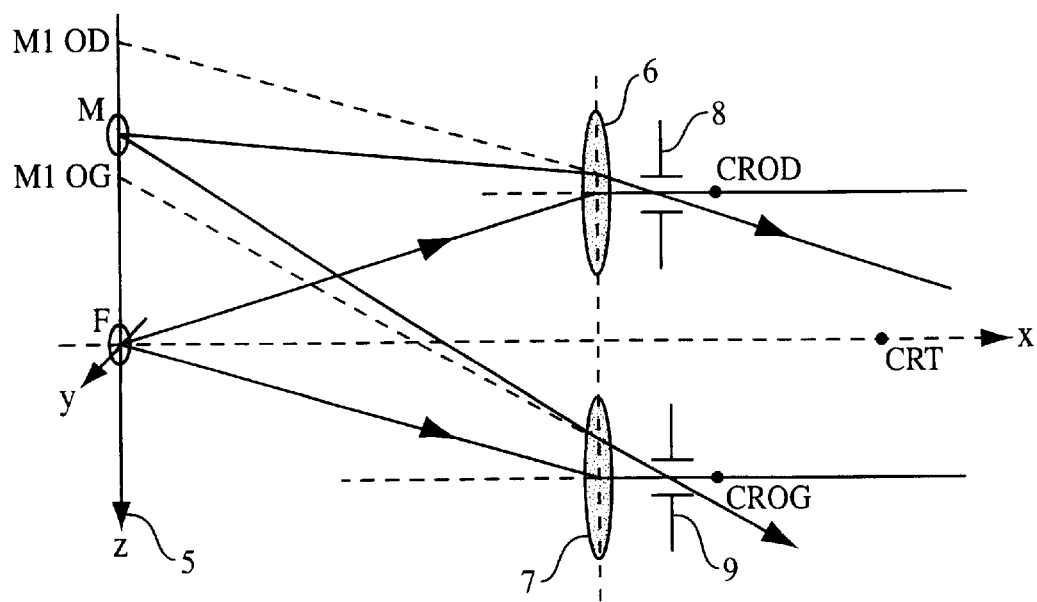
FIG. 2 shows a top view of binocular vision of a point of the grid

FIG. 2 shows a top view of binocular vision to a point of the grid. FIG. 2 shows the grid 5—that constitutes an object plane in this case, and a point M in this object plane. It also shows the right and left spectacle lenses 6 and 7, as well as the pupils 8 and 9 of the right and left eyes. The sagittal plane is symbolised on FIG. 2 by the horizontal line passing through point F of the grid. The points CROD and CROG are the center of rotation of the right and left eyes. The point marked CRT is the center of rotation of the head.

FIG. 2 shows rays originating from point F, and rays originating from the point M, outside of the sagittal plane. The rays originating from point F pass near the center of the lenses, and through the center of the pupil of each eye. They are not exactly parallel, and form corresponding images on the retina, which are normally combined for ensuring binocular vision.

Due to the presence of spectacle lenses, rays originating from the point M are bent when passing through the spectacle lenses; they pass through the center of the pupil of the respective eye and reach the retina of the right and left eyes in positions which may not be combined to ensure binocular vision. The interrupted line going from the right lens to the point M1OD is representative of the position in the object plane where the right eye of the wearer sees the object point M. Similarly, the point M1OG is the point where the left eye sees the point M.

In order to ensure binocular vision, that is combination of the images in the right and left eye of a given point M into a single image, the invention suggests considering the difference in mean sphere between the points $M_D$ and $M_G$ of the aspherical surface of the lenses, where rays originating from the object point M impinges on the aspherical surface of the lenses.

The invention suggests setting an upper limit for this difference, for a set of points in the object space. This limit varies with the addition A to ensure good binocular vision, not only in static vision, but also in dynamic vision.

In other words, for a given point M in the object space, the invention suggests considering the rays originating from M and going to the center of the pupils of the right and left eyes, and determining the difference of mean sphere at the points of intersection of these rays with the aspherical surface of the lens. These two points of intersection are actually the points of the aspherical surface of the right and left lens through which the wearer sees said point M, in his perifoveal visual field.

Turning back to the example of the grid represented in FIG. 1, it is possible to consider a grid having a size of 3000×3000 mm; as for the set of points, it is sufficient to consider a set of 21×21 points, that is to consider 21 possible values of the each of the coordinates u and v. A different number of points, or a different distribution of the points does not change the results of the invention. This size of the grid, and the choice of the point toward which the eye is directed is sufficient in the examples to ensure that most peripheral directions for a lens of 50 mm radius are covered.

In other words, the binocularity parameter may be calculated for a set of points distributed in the perifoveal visual field of the wearer of the lenses, or distributed over the surface of each lens.

The difference in mean sphere may then be calculated for each of these points in the object space. Results of these calculations are shown and discussed below. In the example discussed in relation to FIGS. 1 and 2, the invention suggests using a fixed direction of sight—that is a fixed position of the pupil, and further suggests selecting a set of points in the object space and calculating the difference in mean sphere for this fixed position of the eye. This ensures that the limitation to the mean sphere difference is indeed representative of the quality of dynamic vision.

Figure 3:
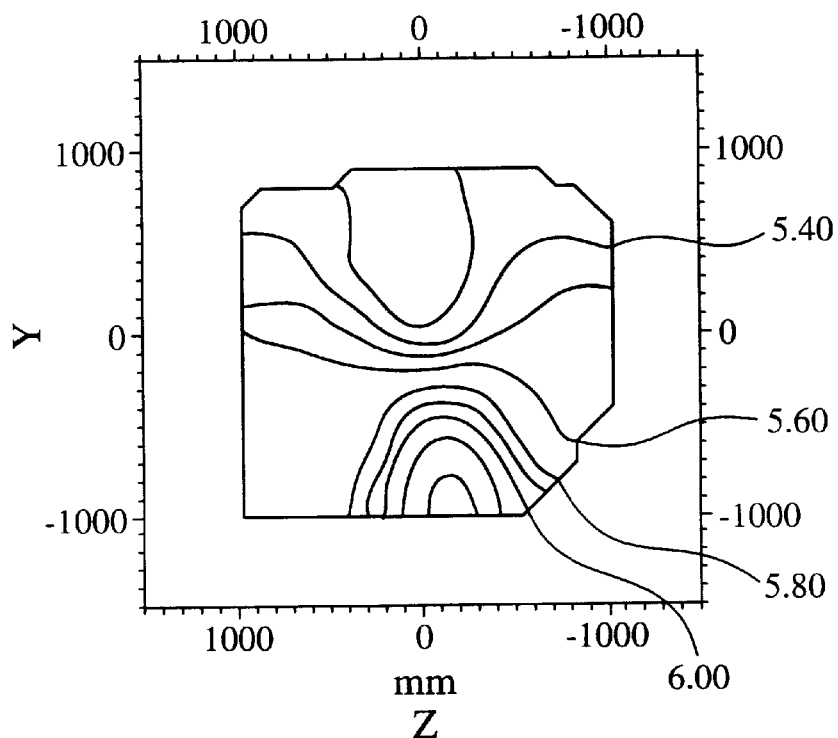
FIGS. 3 to 6 show values of the mean sphere on the aspherical surface of several lenses.
Figure 4:
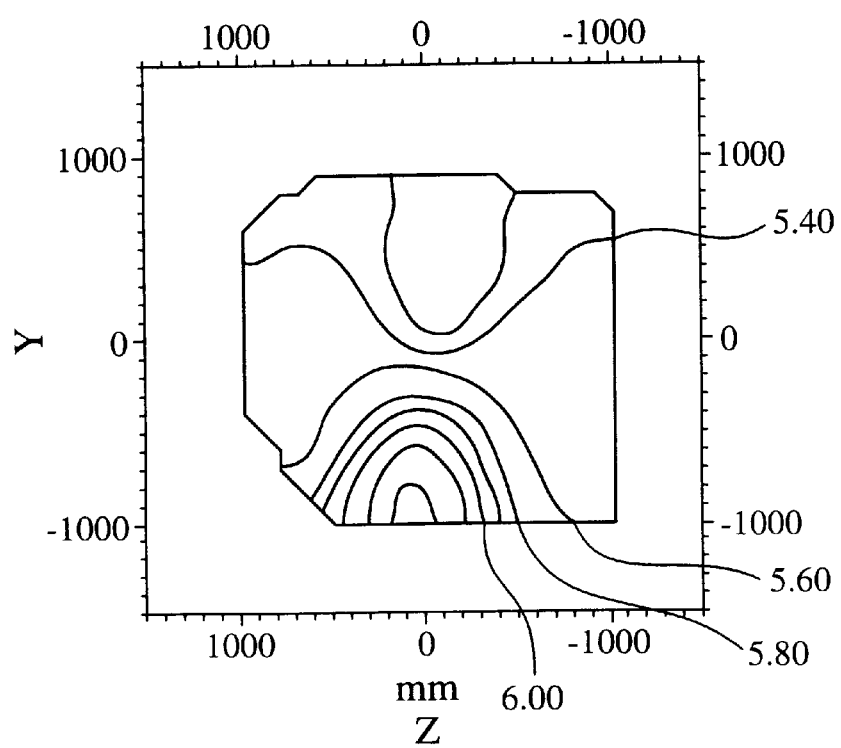
Figure 5:
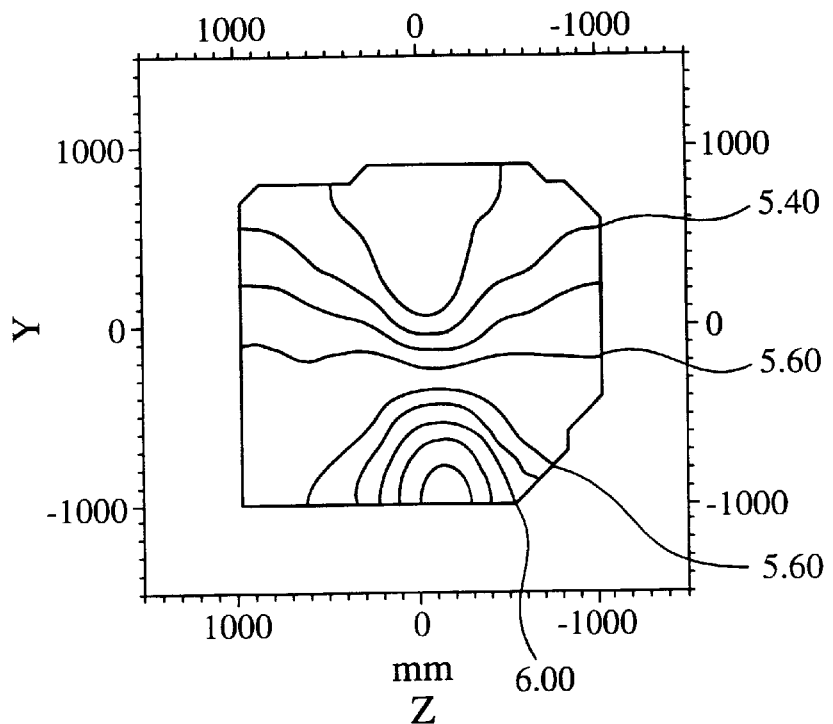
Figure 6:
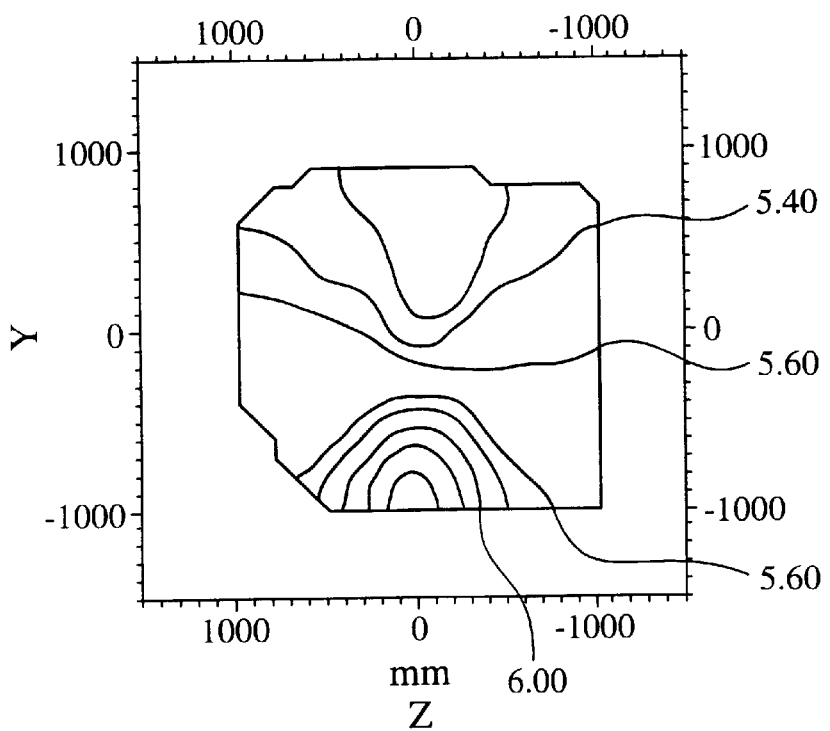

FIGS. 3 to 6 show the values of the mean sphere on the aspherical surface of the lens, for each point of the grid; more specifically, FIGS. 3 to 6 show lines of points of the grid for which value of the mean sphere on the aspherical surface is the same. The horizontal axis shows in mm the position of each point along the z-axis, while the vertical axis shows in mm the position of each point along the y-axis. FIGS. 3 and 4 correspond respectively to the left and right eyes, for a lens of the prior art. FIGS. 5 and 6 correspond respectively to the left and right eyes, for a lens according to the invention. The lenses of FIGS. 3 to 6 have an addition of one diopter.

FIGS. 3 to 6 essentially show that the values for the left and right eyes are symmetrical; this is not surprising inasmuch as the lenses of the figures are symmetrical, a lens for the left eye being the image of a lens for the right eye with respect to the sagittal plane.

In other words, the limitation according to the invention of the difference between the mean sphere of the right and left lenses also causes an overall limitation of the absolute value of the mean sphere gradient of each lens.

Figure 7:
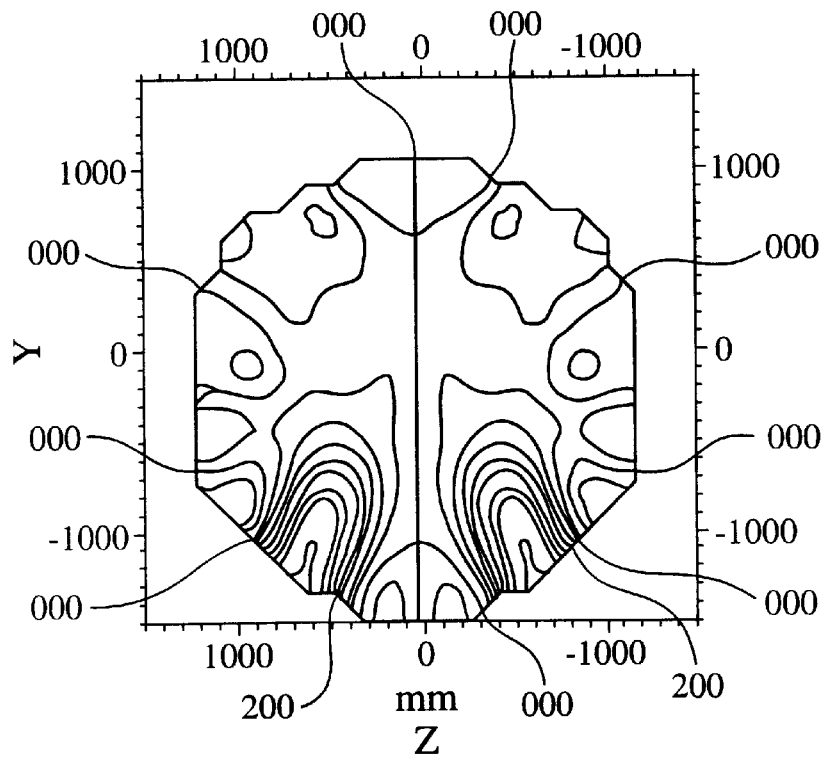
FIGS. 7 to 9 show values of the binocularity parameter of the invention, for several pairs of spectacle lenses.
Figure 8:
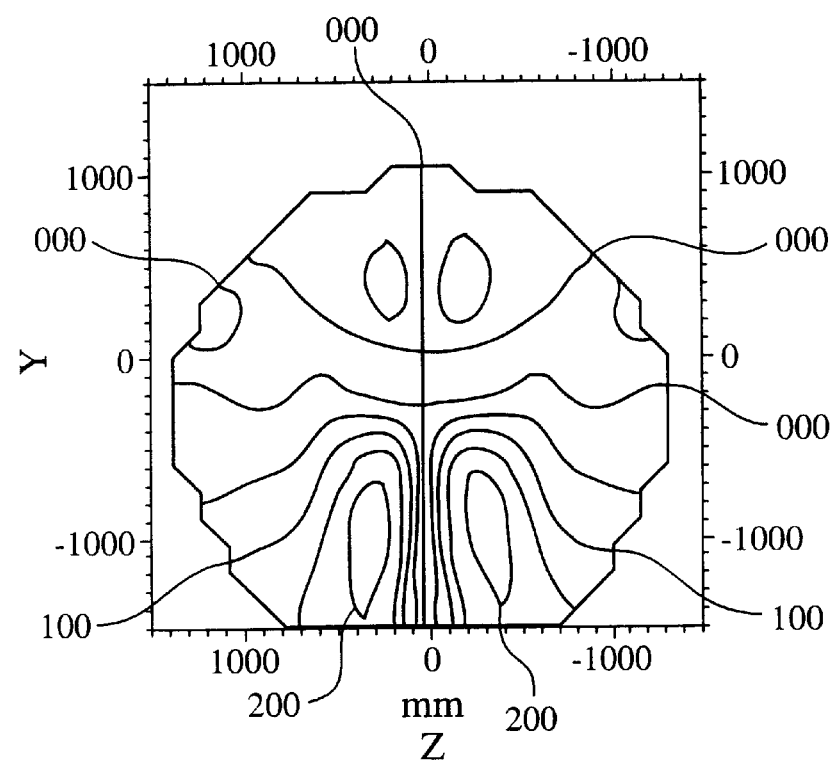
Figure 9:
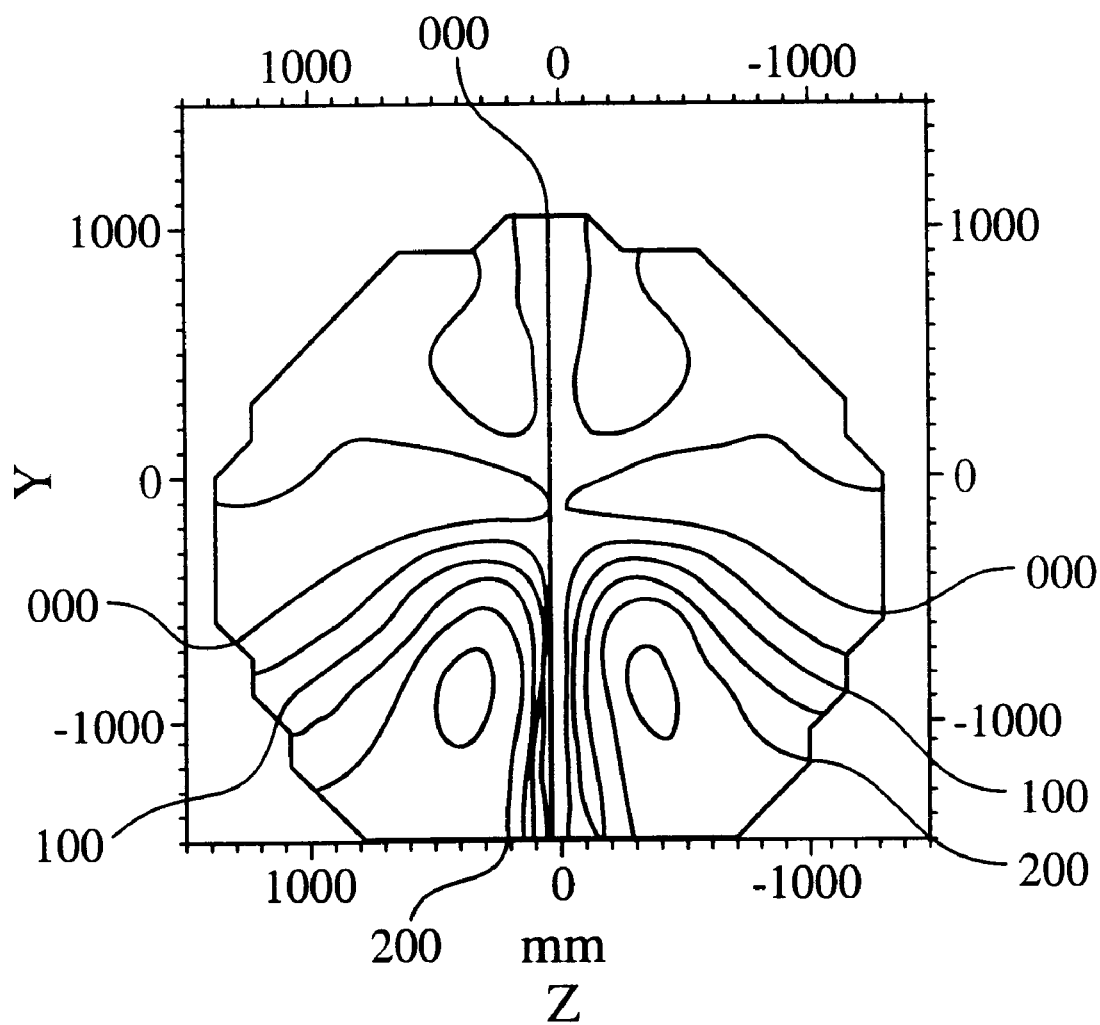

FIGS. 7 to 9 show different values of the mean sphere difference for several lenses. The coordinates on the horizontal and vertical axis are the same as those of FIGS. 3 to 6. These figures show the lines formed of points having the same relative value of the difference in mean sphere; more specifically, for a given point M of the grid, the rays to the right and left eyes through the right and left spectacle lenses are calculated. This provides values $S_D$ and $S_G$ of the mean sphere on the aspherical surface of the lens, at the point of intersection with the rays originating from point M.

The figures show a plot of the relative sphere difference ΔS, also called here binocularity parameter, defined by the formula:

$$\Delta S = 100 \times \frac{S_D - S_G}{\overline{S}} = 100 \times \frac{S_D - S_G}{(S_D + S_G)/2}$$

where $\overline{S}$ is the half sum of the values $S_D$ and $S_G$ of the mean sphere for the right and left spectacle lenses. All figures are plotted for points of the grid corresponding to a spectacle lens having a diameter of 50 mm, centered on the looking point F.

FIG. 7 shows the relative values of the mean sphere difference for a lens of the prior art having an addition of one diopter. The peak to valley value of the binocularity parameter ΔS, that is the difference between the highest and the lowest value of ΔS over the lens is 6.49.

FIG. 8 shows the relative values, for a first embodiment of a lens according to the invention, that also has an addition of one diopter. In this case, the peak to valley value amounts to 3.01.

FIG. 9 shows a view of a second embodiment of a lens according to the invention. The peak to valley value reaches 3.28 on the lens.

FIGS. 7–9 are essentially symmetrical with respect to a vertical line. This is due to the definition of ΔS; ΔS is calculated for a looking point F of the grid in the sagittal plane, the right and left lenses being symmetrical with respect to the sagittal plane. Thus, ΔS is equal to zero for points of the object space in the sagittal plane. The diagrams of FIGS. 8 and 9 do not show high values of the difference ΔS, contrary to the one of FIG. 7.

For an addition of two diopters, a peak to valley of 8 is appropriate.

The limitation of the invention on the mean sphere difference between pairs of points on the aspherical surface associated with the same point in the object space may be calculated for a pair of lenses, as explained above. This limitation depends on the addition A. As discussed above, it is an increasing function of the addition (A).

Preferably, the maximum value for the mean sphere difference is within 30% of a function f of the addition, which may be written $$f(A)=5.9 \times A-2.35$$

Where the right and left lenses are chosen to be symmetrical with respect to the sagittal plane, one point on the nasal side of a lens is the image of a point of the temporal side of the lens in the symmetry with respect to the sagittal plane.

The lenses of the invention may be defined using a theoretical wearer of the spectacles, having optometric parameters—distance between the eyes, position of the spectacle lenses, etc.—corresponding to the mean values of these parameters among possible wearers of the lens. Such parameters are known to the person skilled in the art.

The invention may be used for defining spectacle lenses, using optimisation processes known per se. As known per se, the surface of the lenses is continuous and continually derivable three times. The surface of progressive lenses may be obtained by digital optimization using a computer, setting limiting conditions for a certain number of lens parameters. The invention suggests to use as one of the limiting conditions the maximum value of the difference ΔS.

It should be understood that the grid system described above is but a solution for defining pairs of points on the aspherical surfaces of lenses, which correspond to a given point in the object space. One could use different points in the object space for defining pairs of points; the tests and experiments conducted by the applicant have shown that the choice of the set of points in the object space did not change the results of the invention; the set of points should only be representative of the area of the object field for which dynamic vision and binocularity is to be achieved. The looking point or fixation point F could also be different from the one selected in the preferred embodiment.

In the example of FIG. 2, the aspherical surface of the lens is directed away from the wearer, so that the mean sphere difference is measured for points of the outer surface of the lenses. The invention may as well be carried out for lenses where the aspherical surface is the surface facing the wearer.

The contents of European Patent Application entitled "Pair of Multifocal Progressive Spectacle Lenses," having applicant Essilor International and inventors Bernard Bourdoncle and Sandrine Francois, and filed on Oct. 16, 1998 is incorporated herein by reference in its entirety.

What is claimed is:

1. A pair of progressive ophthalmic spectacle lenses, each lens having an aspherical surface with a far vision zone, an intermediate vision zone and a near vision zone, and good monocular and binocular foveal vision along a principal meridian, each point M of the aspherical surface having a mean sphere defined by the formula:

$$S = \frac{n-1}{2}\left(\frac{1}{R_1} + \frac{1}{R_2}\right)$$

where $R_1$ and $R_2$ are maximum and minimum radii of curvature expressed in meters, and n is the refractive index of the lens material, where the aspherical surface of each lens has an addition (A) defined as the difference in mean sphere between a reference point of the near vision zone and a reference point of the far vision zone, the addition of the aspherical surface of each lens being one diopter or less, wherein for a given direction of sight for a point (M) in the object space a binocularity parameter is defined as the relative difference ΔS of the mean sphere for points ($M_D$, $M_G$) on the aspherical surface of the right and left lenses through which a wearer sees said point (M), and wherein the absolute value of the peak to valley value of the binocularity parameter, defined as the difference between the largest value and the smallest value of the binocularity parameter on one side of the sagittal plane, is about 3.28 or less.

2. The pair of spectacle lenses of claim 1, wherein the relative differences ΔS is defined by the formula:

$$\Delta S = 100 \times \frac{S_D - S_G}{(S_D + S_G)/2}$$

where $S_D$ and $S_G$ are values of mean sphere at said points ($M_D$, $M_G$) on the aspherical surface of the right and left lenses through which the wearer sees said point (M).

3. The pair of spectacle lenses of claim 1, wherein the object space is sampled on a vertical plane.

4. The pair of spectacle lenses of claim 3, wherein the vertical plane is spaced about 80 cm from the lenses.

5. The pair of spectacle lenses of claim 1, wherein the object space includes points distributed in the perifoveal visual field of the wearer.

6. The pair of spectacle lenses of claim 1, wherein said given direction of sight corresponds to an object point in front of the wearer, at a distance of about 80 cm, and about 50 cm lower than the eyes of the wearer.

7. The pair of spectacle lenses of claim 1, wherein the peak to valley value is in the range of about 3.01 to about 3.28.

8. The pair of spectacle lenses of claim 1, wherein each lens has an addition of one diopter.

9. A pair of progressive ophthalmic spectacle lenses, each lens having an aspherical surface with a far vision zone, an intermediate vision zone and a near vision zone, and good monocular and binocular foveal vision along a principal meridian, each point M of the aspherical surface having a mean sphere defined by the formula:

$$S = \frac{n-1}{2}\left(\frac{1}{R_1} + \frac{1}{R_2}\right)$$

where $R_1$ and $R_2$ are maximum and minimum radii of curvature expressed in meters, and n is the refractive index of the lens material, where the aspherical surface of each lens has an addition (A) defined as the difference in mean sphere between a reference point of the near vision zone and a reference point of the far vision zone, the addition of the aspherical surface of each lens being one diopter or less, wherein for a given direction of sight for a point (M) in the object space a binocularity parameter is defined as the relative difference ΔS of the mean sphere for points ($M_D$, $M_G$) on the aspherical surface of the right and left lenses through which a wearer sees said point (M) said relative difference being defined by the formula $$\Delta S = 100 \times \frac{S_D - S_G}{(S_D + S_G)/2}$$

where $S_D$ and $S_G$ are the values of mean sphere at said points ($M_D$, $M_G$) on the aspherical surface of the right and left lenses through which the wearer sees said point (M), and wherein the absolute value of the peak to valley value of the binocularity parameter, defined as the difference between the largest value and the smallest value of the binocularity parameter on one side of the sagittal plane, is about 3.28 or less.

10. The pair of spectacle lenses of claim 9, wherein the object space is sampled on a vertical plane.

11. The pair of spectacle lenses of claim 10, wherein the vertical plane is spaced about 80 cm from the lenses.

12. The pair of spectacle lenses of claim 9, wherein the object space includes points distributed over the perifoveal visual field of the wearer.

13. The pair of spectacle lenses of claim 9, wherein said given direction of sight corresponds to an object point in front of the wearer, at a distance of about 80 cm, and about 50 cm lower than the eyes of the wearer.

14. The pair of spectacle lenses of claim 9, wherein the peak to valley value is in the range of about 3.01 to about 3.28.

15. The pair of spectacle lenses of claim 9, wherein each lens has an addition of one diopter.

16. A pair of progressive ophthalmic spectacle lenses, each lens having an aspherical surface with a far vision zone, an intermediate vision zone and a near vision zone, and good monocular and binocular foveal vision along a principal meridian, each point M of the aspherial surface having a mean sphere defined by the formula:

$$S = \frac{n-1}{2}\left(\frac{1}{R_1} + \frac{1}{R_2}\right)$$

where $R_1$ and $R_2$ are maximum and minimum radii of curvature expressed in meters, and n is the refractive index of the lens material, where the aspherical surface of each lens has an addition (A) defined as the difference in mean sphere between a reference point of the near vision zone and a reference point of the far vision zone, the addition of the aspherical surface of each lens being two diopters, wherein for a given direction of sight for a point (M) in the object space, a binocularity parameter is defined as the relative difference ΔS of the mean sphere for points ($M_D$, $M_G$) on the aspherical surface of the right and left lenses through which a wearer sees said point (M), and wherein the absolute value of the peak to valley value of the binocularity parameter, defined as the difference between the largest value and the smallest value of the binocularity parameter on one side of the sagittal plane, is about 8 or less.

17. The pair of spectacle lenses of claim 16, wherein the relative differences ΔS is defined by the formula:

$$\Delta S = 100 \times \frac{S_D - S_G}{(S_D + S_G)/2}$$

where $S_D$ and $S_G$ are values of mean sphere at said points ($M_d$, $M_G$) on the aspherical surface of the right and left lenses through which the wearer sees said point (M).

18. The pair of spectacle lenses of claim 16, wherein the object space is sampled on a vertical plane.

19. The pair of spectacle lenses of claim 16, wherein the vertical plane is spaced about 80 cm from the lenses.

20. The pair of spectacle lenses of claim 16, wherein the object space includes points distributed in the perifoveal visual field of the wearer.

21. The pair of spectacle lenses of claim 16, wherein said given direction of sight corresponds to an object point in front of the wearer, at a distance of about 80 cm, and about 50 cm lower than the eyes of the wearer.

22. The pair of spectacle lenses of any one of claims 16–21, wherein the peak to valley value is in the range of about 8.

23. A method of characterizing a pair of progressive ophthalmic spectacle lenses, comprising
defining a binocularity parameter by
selecting a direction of sight;
selecting a point in the object space;
tracing rays to the selected point, through the right and left lenses;
comparing the value of the mean sphere at the respective intersection of the rays with the right and left lenses.

24. The method of claim 23, wherein the relative difference ΔS is defined by the formula:

$$\Delta S = 100 \times \frac{S_D - S_G}{(S_D + S_G)/2}$$

where $S_D$ and $S_G$ are values of mean sphere at said points ($M_D$, $M_G$) on the aspherical surface of the right and left lenses through which the wearer sees said point (M).

25. The method of claim 23, further comprising repeating the comparison for additional points in the object space.

26. The method of claim 25, wherein the points in the object space are distributed in the perifoveal visual field of a wearer of the lenses.

27. The method of claim 26, wherein the points in the object space are sampled on a vertical plane.

28. The method of claim 27, wherein the vertical plane is spaced about 80 cm from the lenses.

29. The method of claim 28, wherein the points in the object space are sampled from a set of points in the object space chosen so that points of the aspherical surface through which the wearer sees said points of said set are distributed on each of the right and left lenses.

30. The method of claim 23, wherein said given direction of sight corresponds to an object point in front of the wearer, at a distance of about 80 cm, and about 50 cm lower than the eyes of the wearer.

31. A method of manufacturing a pair of progressive ophthalmic spectacle lenses, each lens having an aspherical surface with a far vision zone, an intermediate vision zone and a near vision zone, said method comprising:
in the design of the surfaces of the lenses, utilizing as a limiting condition a maximum value for an absolute value of the difference between a binocularity parameter for any two points in a set of points in the object space, the binocularity parameter being defined for a given direction of sight by a relative difference ΔS of the mean sphere for points ($M_D$, $M_G$) on the aspherical surface of the right and left lenses through which a wearer sees a point (M) in the object space.

32. The method of claim 31, wherein the relative difference is defined by the formula $$\Delta S = 100 \times \frac{S_D - S_G}{(S_D + S_G)/2}.$$

33. The method of claim 31, wherein the set of points in the object space are chosen so that the wearer views the points of the set through points distributed over the aspherical surface of each lens.

34. The method of claim 31, wherein the set of points in the object space are distributed over the perifoveal visual field of the wearer.

35. The method of claim 31, wherein the aspherical surface of each lens has an addition (A) defined as the difference in mean sphere between a reference point of the near vision zone and a reference point of the far vision zone, and the method further comprises setting said maximum value based on said addition.

36. The method of claim 35, wherein said maximum value is set based on an increasing function of said addition.

* * * * *